US008977979B2

(12) United States Patent  (10) Patent No.: US 8,977,979 B2
Balasubramanian et al.  (45) Date of Patent: Mar. 10, 2015

(54) SOCIAL NETWORK RELATIONSHIP MAPPING

(75) Inventors: Swaminathan Balasubramanian, Troy, MI (US); John H. Handy-Bosma, Cedar Park, TX (US); Brian M. O'Connell, Durham, NC (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 102 days.

(21) Appl. No.: 12/960,726

(22) Filed: Dec. 6, 2010

(65) Prior Publication Data

US 2012/0144317 A1  Jun. 7, 2012

(51) Int. Cl.
*G06F 3/048* (2013.01)
*H04L 29/08* (2006.01)
(Continued)

(52) U.S. Cl.
CPC .......... *H04L 67/24* (2013.01); *G06F 17/30572* (2013.01); *G06F 3/0482* (2013.01)
USPC ........... 715/781; 715/804; 715/808; 715/809; 705/319; 707/771

(58) Field of Classification Search
CPC ................. G06Q 10/06–10/109; G06Q 50/01; H04L 12/588; H04L 67/22; G06F 17/30572; G06F 9/543; G06F 3/048–3/04886
USPC .......................... 707/600–899; 709/200–253; 715/200–867; 705/1.1–500; 345/1.1–689
See application file for complete search history.

(56) References Cited

U.S. PATENT DOCUMENTS 7,162,465 B2  1/2007  Jenssen et al.
7,167,910 B2 *  1/2007  Farnham et al. .............. 709/223
(Continued)

FOREIGN PATENT DOCUMENTS

CN  1852107 A  10/2006
CN  101765840 A  6/2010
WO  WO 2009/116049 A2  9/2009

OTHER PUBLICATIONS

Heer, J., Card, S. K., & Landay, J. A. 2005. prefuse: a toolkit for interactive information visualization. In Proceedings of the SIGCHI conference on Human factors in computing systems (CHI '05). New York: ACM, 421-430.*

(Continued)

*Primary Examiner* — William Bashore
*Assistant Examiner* — Linda Huynh
(74) *Attorney, Agent, or Firm* — Edward J. Lenart; John R. Pivnichny; Biggers Kennedy Lenart Spraggins LLP (57) ABSTRACT

Methods, systems, and computer program products are provided for social network relationship mapping. In an embodiment, a method is disclosed that includes identifying one or more terms within content displayed to a user; for each identified term: transmitting the identified term to one or more social networking servers supporting a social networking application, in response to transmitting the identified term to the social networking servers, receiving from the social networking servers a list of people that correspond with the identified term, directing a display device to display the list of people that correspond with the identified term, and in response to user input, adding an identification of a person from the list of people to a mapping clipboard; directing the display device to display a relationship graph that indicates how people identified in the mapping clipboard are connected to each other in the social networking application.

17 Claims, 9 Drawing Sheets

(51) Int. Cl.
*G06F 17/30* (2006.01)
*G06F 3/0482* (2013.01)

(56) References Cited

U.S. PATENT DOCUMENTS

| | | | |
|---|---|---|---|
| 7,249,123 B2 | 7/2007 | Elder et al. | |
| 7,269,590 B2 | 9/2007 | Hull et al. | |
| 7,472,110 B2 | 12/2008 | Achlioptas | |
| 7,747,648 B1* | 6/2010 | Kraft et al. | 707/790 |
| 2002/0111962 A1* | 8/2002 | Crucs | 707/505 |
| 2003/0158855 A1* | 8/2003 | Farnham et al. | 707/102 |
| 2004/0254938 A1* | 12/2004 | Marcjan et al. | 707/100 |
| 2005/0038797 A1 | 2/2005 | Tabuchi | |
| 2005/0154994 A1* | 7/2005 | Chen et al. | 715/770 |
| 2005/0159970 A1* | 7/2005 | Buyukkokten et al. | 705/1 |
| 2005/0276479 A1* | 12/2005 | Goldberg et al. | 382/181 |
| 2007/0106780 A1* | 5/2007 | Farnham et al. | 709/223 |
| 2007/0124291 A1* | 5/2007 | Hassan et al. | 707/3 |
| 2007/0192299 A1 | 8/2007 | Zuckerberg et al. | |
| 2007/0208719 A1* | 9/2007 | Tran | 707/3 |
| 2008/0104225 A1* | 5/2008 | Zhang et al. | 709/224 |
| 2008/0140644 A1* | 6/2008 | Franks et al. | 707/5 |
| 2008/0222170 A1* | 9/2008 | Farnham et al. | 707/100 |
| 2009/0006388 A1* | 1/2009 | Ives et al. | 707/5 |
| 2009/0172081 A1 | 7/2009 | Bryant et al. | |
| 2009/0228830 A1* | 9/2009 | Herz et al. | 715/808 |
| 2009/0287685 A1* | 11/2009 | Charnock et al. | 707/5 |
| 2009/0313346 A1 | 12/2009 | Sood | |
| 2010/0017753 A1 | 1/2010 | Li et al. | |
| 2010/0070485 A1* | 3/2010 | Parsons et al. | 707/709 |
| 2010/0082695 A1* | 4/2010 | Hardt | 707/798 |
| 2011/0043652 A1* | 2/2011 | King et al. | 348/222.1 |
| 2011/0078188 A1* | 3/2011 | Li et al. | 707/776 |
| 2011/0078190 A1* | 3/2011 | Samuel et al. | 707/780 |
| 2011/0202886 A1* | 8/2011 | Deolalikar et al. | 715/853 |
| 2011/0208814 A1* | 8/2011 | Bostrom et al. | 709/204 |
| 2011/0258535 A1* | 10/2011 | Adler et al. | 715/235 |
| 2011/0264528 A1* | 10/2011 | Whale | 705/14.58 |
| 2011/0283205 A1* | 11/2011 | Nie et al. | 715/763 |
| 2012/0054691 A1* | 3/2012 | Nurmi | 715/854 |

OTHER PUBLICATIONS

"Rafik al-Hariri". (2006). EMM News Explorer. European Media Monitor. http://press.jrc.it/NewsExplorer/entities/en/40128.html as evidenced by WayBackMachine on Dec. 12, 2006.*

Gapminder World Guide. (Mar. 2010). From www.gapminder.org.*

Pouliquen, B. L., Steinberger, R., Ignat, C., & Oellinger, T. (2006). Building and displaying name relations using automatic unsupervised analysis of newspaper articles. Proceedings of the 8th International Conference on the Statistical Analysis of Textual Data, 794-804.*

Heer, J. & Boyd, D. (2005). Vizster: Visualizing online social networks. Proceedings of Symposium on Information Visualization. Minneapolis, MN: IEEE Press, 33-40.*

"Clustered news for Monday, Dec. 11, 2006". (2006). EMM News Explorer. European Media Monitor. http://press.jrc.it/NewsExplorer/home/en/latest.html as evidenced by WayBackMachine on Dec. 12, 2006.*

Steinberger R., Pouliquen, B., & van der Goot, E. (2009). An introduction to the Europe Media Monitor family of applications. In: Fredric Gey, Noriko Kando & Jussi Karlgren (eds.): Information Access in a Multilingual World—Proceedings of the SIGIR 2009 Workshop (SIGIR-CLIR'2009), pp. 1-8. Boston.*

Wilson et al., User Interactions in Social Networks and Their Implications, Association for Computing Machinery (ACM) Digital Library, Apr. 2009, European Conference on Computer Systems (EuroSys), Nuremberg, Germany.

Yu et al., Searching Social Networks, Association for Computing Machinery (ACM) Digital Library, Jul. 2003, Autonomous Agents and Multiagent Systems (AAMAS), Melbourne, Australia.

* cited by examiner

SOCIAL NETWORK RELATIONSHIP MAPPING

TECHNICAL FIELD

The field of the invention is data processing, or, more specifically, methods, apparatus, and products for social network relationship mapping.

BACKGROUND

In the context of a social network, a connection is a known relationship between two people. Such a connection maybe established between those two people using a social network application that manages the social network. Typically, a connection is established through a request from the first person that is accepted by the second person. The request is often referred to as a friend request or link request. Furthermore, a connection may have an attribute defining how the first person and second person are related. The attribute can be, for example, friends, relatives, colleagues, present and former co-workers, classmates, people that share similar interests, and so on.

BRIEF SUMMARY

Methods, systems, and computer program products are provided for social network relationship mapping. In an embodiment, a method is disclosed that includes a social network relationship mapping computer identifying one or more terms within content displayed to a user. The method includes for each identified term: the social network relationship mapping computer transmitting the identified term to one or more social networking servers supporting a social networking application. The method also includes for each identified term: in response to the social network relationship mapping computer transmitting the identified term to the one or more social networking servers, the social network relationship mapping computer receiving from the one or more social networking servers a list of people that correspond with the identified term. The method also includes for each identified term: the social network relationship mapping computer directing a display device to display the list of people that correspond with the identified term. The method also includes for each identified term: in response to user input, the social network relationship mapping computer adding an identification of a person from the list of people to a mapping clipboard. The method also includes the social network relationship mapping computer directing the display device to display a relationship graph that indicates how people identified in the mapping clipboard are connected to each other in the social networking application.

In another embodiment, a computer system for social network relationship mapping is disclosed that includes one or more processors, one or more computer-readable memories and one or more computer-readable, tangible storage devices. The computer system also includes program instructions, stored on at least one of the one or more storage devices for execution by at least one of the one or more processors via at least one of the one or more memories, to identify one or more terms within content displayed to a user. The computer system also includes program instructions, stored on at least one of the one or more storage devices for execution by at least one of the one or more processors via at least one of the one or more memories, to for each identified term: transmit the identified term to one or more social networking servers supporting a social networking application. The computer system also includes program instructions, stored on at least one of the one or more storage devices for execution by at least one of the one or more processors via at least one of the one or more memories, to for each identified term: in response to transmitting the identified term to the one or more social networking servers, receive from the one or more social networking servers a list of people that correspond with the identified term. The computer system also includes program instructions, stored on at least one of the one or more storage devices for execution by at least one of the one or more processors via at least one of the one or more memories, to for each identified term: direct a display device to display the list of people that correspond with the identified term. The computer system includes program instructions, stored on at least one of the one or more storage devices for execution by at least one of the one or more processors via at least one of the one or more memories, to for each identified term: in response to user input, add an identification of a person from the list of people to a mapping clipboard. The computer system also includes program instructions, stored on at least one of the one or more storage devices for execution by at least one of the one or more processors via at least one of the one or more memories, to direct the display device to display a relationship graph that indicates how people identified in the mapping clipboard are connected to each other in the social networking application.

In another embodiment, a computer program product for social network relationship mapping is disclosed that includes one or more computer-readable, tangible storage devices. The computer program product includes program instructions, stored on at least one of the one or more storage devices, to identify one or more terms within content displayed to a user. The computer program product also includes program instructions, stored on at least one of the one or more storage devices, to for each identified term: transmit the identified term to one or more social networking servers supporting a social networking application. The computer program product also includes program instructions, stored on at least one of the one or more storage devices, to for each identified term: in response to transmitting the identified term to the one or more social networking servers, receive from the one or more social networking servers a list of people that correspond with the identified term. The computer program product also includes program instructions, stored on at least one of the one or more storage devices, to for each identified term: direct a display device to display the list of people that correspond with the identified term. The computer program product also includes program instructions, stored on at least one of the one or more storage devices, to for each identified term: in response to user input, add an identification of a person from the list of people to a mapping clipboard. The computer program product also includes program instructions, stored on at least one of the one or more storage devices, to direct the display device to display a relationship graph that indicates how people identified in the mapping clipboard are connected to each other in the social networking application.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

In the course of developing the invention, the inventors discovered that identifying and establishing a social network connection with people may be time consuming and difficult for a user. There is therefore an ongoing need for improvement in social network relationship mapping.

Figure 1:
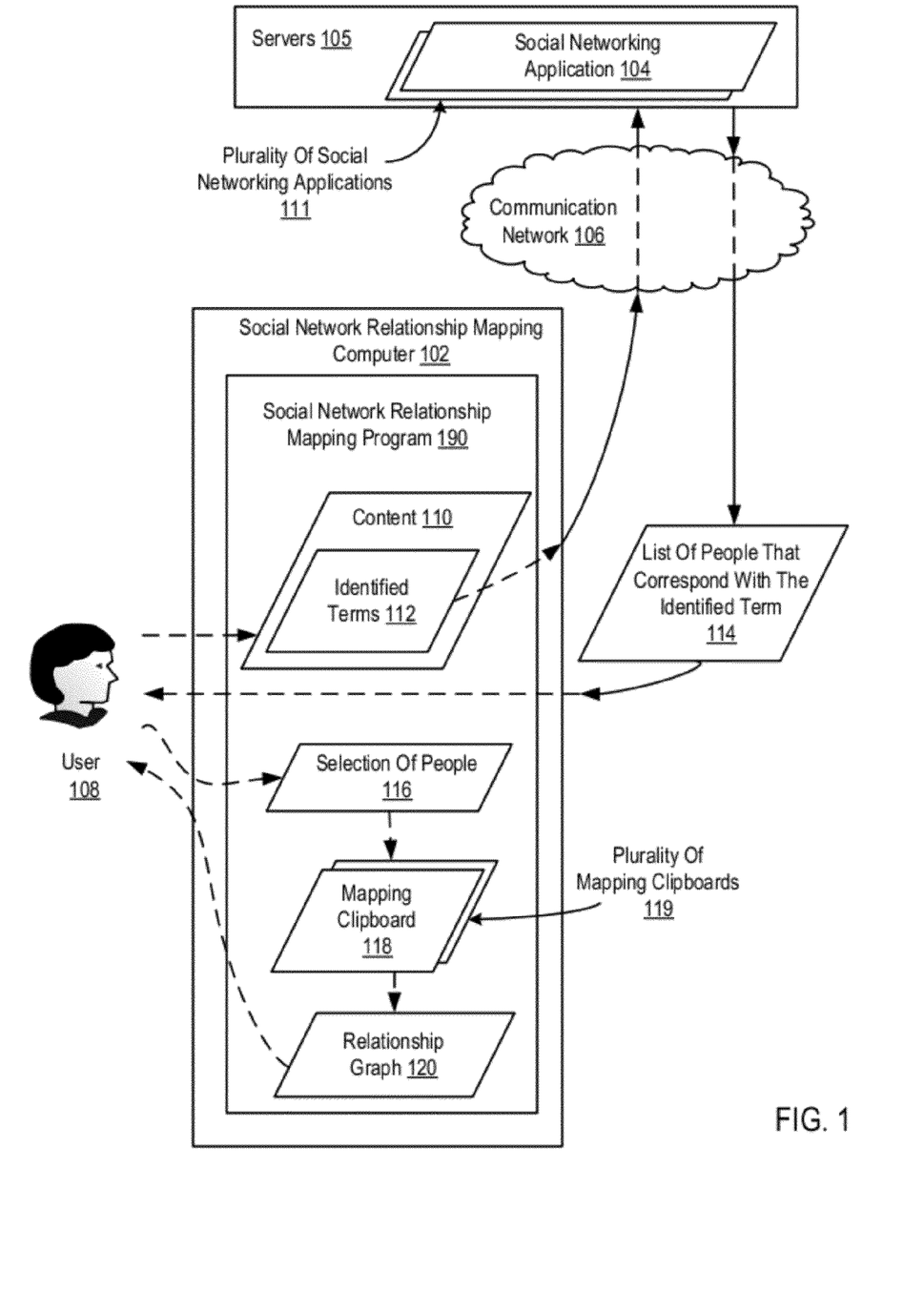
FIG. 1 sets forth a network diagram of a system for social network relationship mapping according to embodiments of the present invention.

Exemplary methods, systems, and products for social network relationship mapping in accordance with the present invention are described with reference to the accompanying drawings, beginning with FIG. 1. FIG. 1 sets forth a network diagram of a system for social network relationship mapping according to embodiments of the present invention. The system of FIG. 1 includes social network relationship mapping computer (102) that communicates through communication network (106) with one or more social network servers (105) supporting social networking application (104). Social network servers (105) include plurality (111) of social network applications. Each social network application of plurality (111) of social network applications may be on one or more servers of the servers (105).

Social network relationship mapping computer (102) of FIG. 1 includes social network relationship mapping program (190) that is configured to scan content (110) that is being displayed to user (108). Content (110) of FIG. 1 may include electronic files and documents in a variety of formats, such as PDF, DOC, XLS, or any other format. During the scan of content (110), social network relationship mapping program (190) identifies terms (112) within content (110). Social network relationship mapping program (190) transmits identified terms (112) to social networking application (104) as part of a query to determine if identified terms (112) correspond with profiles of people, which profiles are part of a social network managed by social networking application (104).

Figure 2:
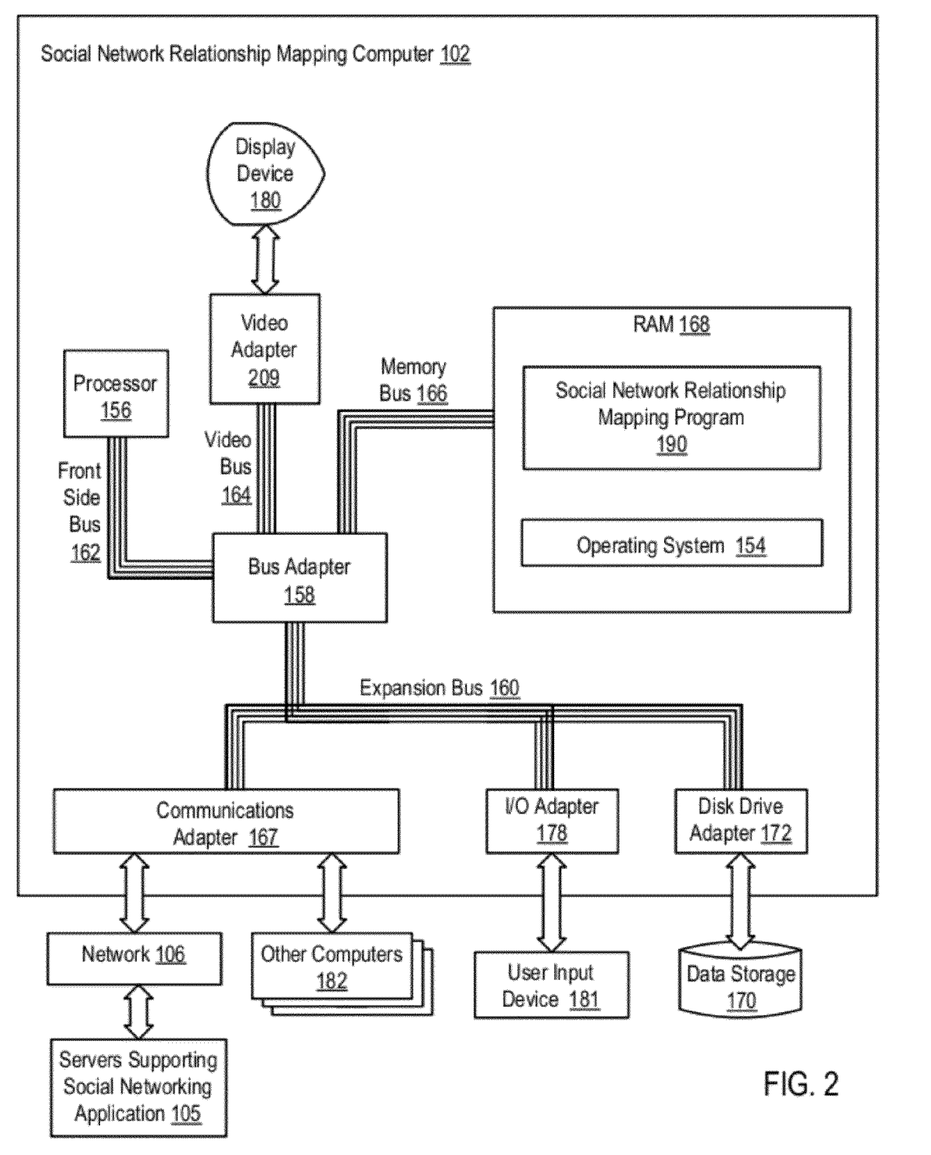
FIG. 2 sets forth a block diagram of automated computing machinery comprising an exemplary social network relationship mapping computer useful in social network relationship mapping according to embodiments of the present invention.

In response to detecting that an identified term of terms (112) corresponds with one or more profiles managed by social networking application (104), one or more social networking servers (105) supporting social networking application (104) transmit to social network relationship mapping computer (102) list (114) of people that correspond with the identified term. Social network relationship mapping program (190) of FIG. 1 displays list (114) of people that correspond with the identified term to user (108). User (108) may select one or more identifications (116) of persons from list (114) to add to mapping clipboard (118). Mapping clipboard (118) is a list of people belonging to social networking application (104). Social network relationship mapping program (190) includes plurality (119) of mapping clipboards. Each of the mapping clipboards of plurality (119) of mapping clipboards, such as mapping clipboard (118), may correspond with a particular collection of identifications of people. Mapping clipboard (118) of FIG. 1 may be an electronic data file that is stored on social network relationship mapping computer (102). Social network relationship mapping program (190) may continue to scan content (110) to identify terms, transmit those terms to social networking application (104), receive lists of people corresponding to those terms, and add identifications of any people selected by user (108) to one or more of plurality (119) of mapping clipboards.

Social network relationship mapping program (190) of FIG. 1 generates relationship graph (120) that indicates connections between the people listed in mapping clipboard (118). Relationship graph (120) may be a visual illustration of connections between people. Each person illustrated in relationship graph (120) may be connected to one or more people in mapping clipboard (118) by a single connection or through connections to one or more people that are or are not listed in mapping clipboard (118). Queries related to one or more people whom are not listed in mapping clipboard (118) but are connected to one or more people whom are listed in mapping clipboard (118) may be transmitted by social network relationship mapping program (190) to social networking application (104). A query is a request from social network relationship mapping program (190) for more information about a particular person or particular people. In response to the queries, social network relationship mapping program (190) receives information and connection information about people and adds the people to relationship graph (120). In response to relationship graph (120) including connections for every person identified in mapping clipboard (118), social network relationship mapping program (190) may stop construction of relationship graph (120) and direct display device (180) of FIG. 2 to display completed relationship graph (120) to user (108). By using relationship graph (120), which illustrates connections of people that correspond with identified terms (112) in content (110), user (108) may be able to quickly and efficiently identify people within social networking application (104) that correspond to the topic of content (110). As such, user (108) may be presented with, via relationship graph (120), new contacts to add to a social network profile of the user within social networking application (104).

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Social network relationship mapping in accordance with exemplary embodiments of the present invention is generally implemented with computers, that is, with automated computing machinery. In the system of FIG. 1, for example, each of social network relationship mapping computer (102), social network relationship mapping program (190), communication network (106), and social networking application (104) are implemented to some extent at least as or with computers. For further explanation, therefore, FIG. 2 sets forth a block diagram of automated computing machinery comprising exemplary social network relationship mapping computer (102) useful in social network relationship mapping according to embodiments of the present invention. Social network relationship mapping computer (102) of FIG. 2 includes one or more computer processors (156), which can be provided by a Central Processing Unit ('CPU'), as well as random access memory (168) ('RAM') which is connected through high speed memory bus (166) and bus adapter (158) to processor (156) and to other components of social network relationship mapping computer (102). RAM (168) is a computer readable tangible storage device that includes computer readable memory.

Stored in RAM (168) is social network relationship mapping program (190) that includes computer program instructions for social network relationship mapping. Also stored in RAM (168) is operating system (154). Operating systems useful for social network relationship mapping according to embodiments of the present invention include UNIX®, Linux®, Microsoft® XP®, AIX®, IBM® i5/OS® and others as will occur to those of skill in the art. Microsoft, Windows, Windows XP, are trademarks of Microsoft Corporation in the United States, other countries, or both. UNIX is a registered trademark of The Open Group in the United States and other countries. Linux is a registered trademark of Linus Torvalds in the United States, other countries, or both. Operating system (154) and social network relationship mapping program (190) in the example of FIG. 2 are shown in RAM (168), but many program instructions of such software typically are stored in non-volatile memory also, such as, for example, on disk drive (170).

Social network relationship mapping computer (102) of FIG. 2 includes disk drive adapter (172) coupled through expansion bus (160) and bus adapter (158) to processor (156) and other components of social network relationship mapping computer (102). Disk drive adapter (172) connects non-volatile data storage to social network relationship mapping computer (102) in the form of disk drive (170). Disk drive adapters useful in computers for social network relationship mapping according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

Example social network relationship mapping computer (102) of FIG. 2 includes input/output ('I/O') adapter (178). I/O adapter (178) implements user-oriented input/output through, for example, software drivers and computer hardware for controlling output to a display device such as a computer display screen, or user input from user input device (181), which can be, for example, a keyboard or mouse. Example social network relationship mapping computer (102) of FIG. 2 includes video adapter (209), which is an example of an I/O adapter specially designed for graphic output to display device (180) such as a display screen or computer monitor. Video adapter (209) is connected to processor (156) through high speed video bus (164), bus adapter (158), and front side bus (162), which is also a high speed bus.

Exemplary social network relationship mapping computer (102) of FIG. 2 includes communications adapter (167) for data communications with other computers (182) and for data communications with data communications network (106) and social networking servers (105) supporting social networking application (104). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for social network relationship mapping according to embodiments of the present invention include modems for wired dial-up communications, Ethernet (IEEE 802.3) adapters for wired data communications network communications, and 802.11 adapters for wireless data communications network communications.

Figure 3:
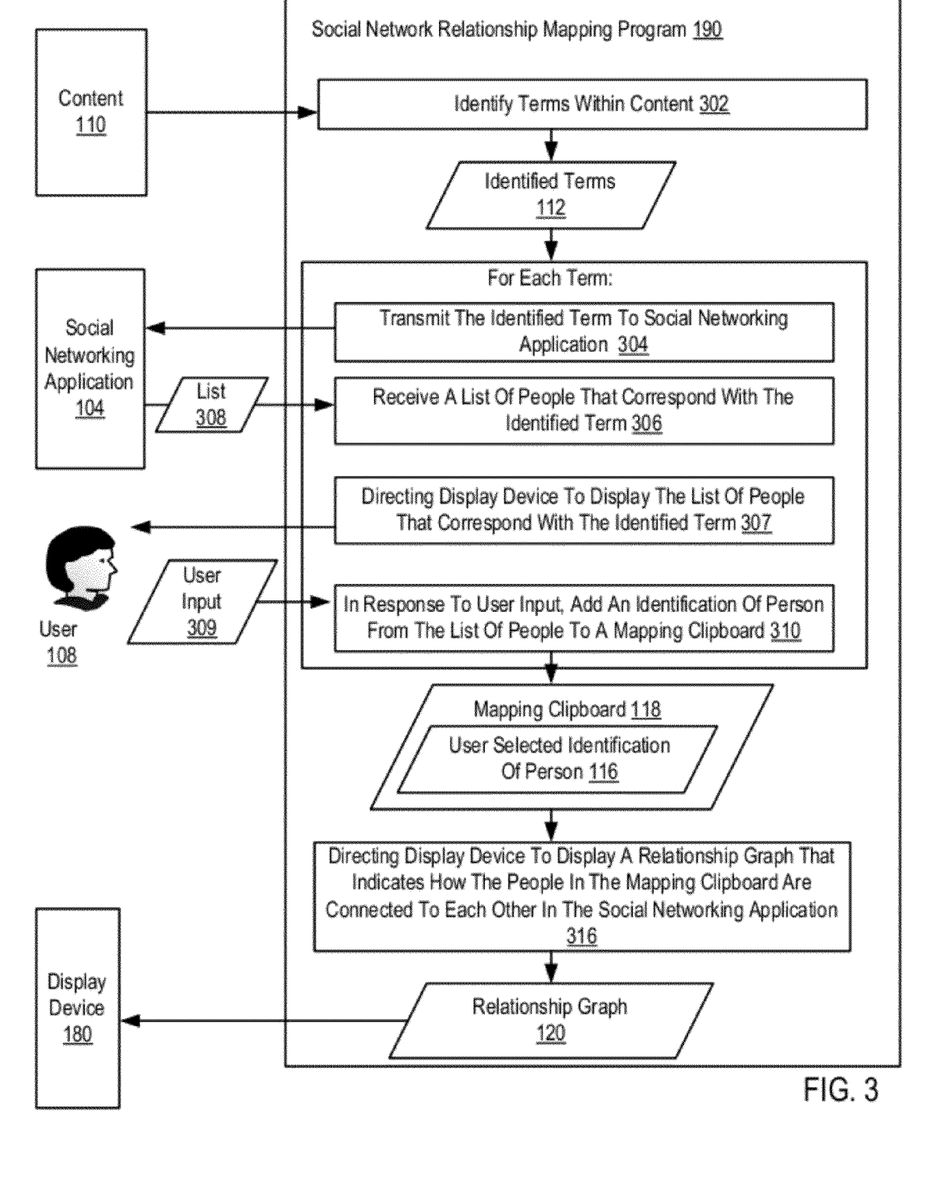
FIG. 3 sets forth a flow chart illustrating an exemplary method for social network relationship mapping according to embodiments of the present invention.

For further explanation, FIG. 3 sets forth a flow chart illustrating an exemplary method for social network relationship mapping according to embodiments of the present invention. The method of FIG. 3 includes social network relationship mapping program (190) identifying (302) terms (112) within content (110) displayed to user (108). Identifying (302) terms (112) within content (110) may be carried out by social network relationship mapping program (190) scanning content (110) for those of terms (112) that are searchable within social network application (104), for example, names, email addresses, phone numbers, tags, employee identifiers, and employer identifiers. The scanning can be performed by social network relationship mapping program (190) using searching techniques such as searching for regular expressions, pattern matching, and using content dictionaries. Identifying (302) may include using any known detection technique.

The method of FIG. 3 includes for each identified term of identified terms (112), social network relationship mapping program (190) transmitting (304) the identified term to social networking application (104) via one or more social networking servers (105). Transmitting (304) the identified term may be carried out by, for example, social network relationship mapping program (190) establishing a connection between social network relationship mapping computer (102) and one or more social networking servers (105) supporting social networking application (104), social network relationship mapping program (190) converting the identified term into data for transmission, and social network relationship mapping program (190) transmitting the data to social networking application (104).

The method of FIG. 3 also includes for each identified term of identified terms (112), in response to transmitting the identified term to social networking application (104), social network relationship mapping program (190) receiving (306), from one or more social networking servers (105), list (308) of people that correspond with the identified term. Receiving (306) list (308) may be carried out by, for example, social network relationship mapping program (190) establishing a connection between social network relationship mapping computer (102) and one or more social networking servers (105) supporting social networking application (104) and social network relationship mapping program (190) storing list (308) in social network relationship mapping computer (102).

The method of FIG. 3 also includes for each identified term of identified terms (112), social network relationship mapping program (190) directing (307) display device (180) to display list (308) of people that correspond with the identified term. Directing (307) display device (180) to display list (308) may be carried out by social network relationship mapping program (190) transmitting a command to display device (180) to display selectable options corresponding to identifications of names on list (308).

The method of FIG. 3 also includes for each identified term of the identified terms (112), in response to user input (309), social network relationship mapping program (190) adding (310) identification (116) of a person from list (308) of people to mapping clipboard (118). Adding (310) identification (116) of the person from list (308) to mapping clipboard (118) may be carried out by social network relationship mapping program (190) directing display device (180) to display names of persons from list (308), such as through a drop down menu, social network relationship mapping program (190) receiving a selection from the drop down menu, and social network relationship mapping program (190) storing data that corresponds to the person selected in the drop down menu in social network relationship mapping computer (102).

The method of FIG. 3 includes social network relationship mapping program (190) directing (316) display device (180) to display relationship graph (120) that indicates how the people identified in mapping clipboard (118) are connected to each other in social networking application (104). Directing (316) display device (180) to display relationship graph (120) may be carried out by social network relationship mapping program (190) receiving a command from user (108) instructing social network relationship mapping program (190) to construct relationship graph (120), social network relationship mapping program (190) constructing relationship graph (120), and social network relationship mapping program (190) transmitting display data corresponding to relationship graph (120) to display device (180) of social network relationship mapping computer (102).

Figure 4:
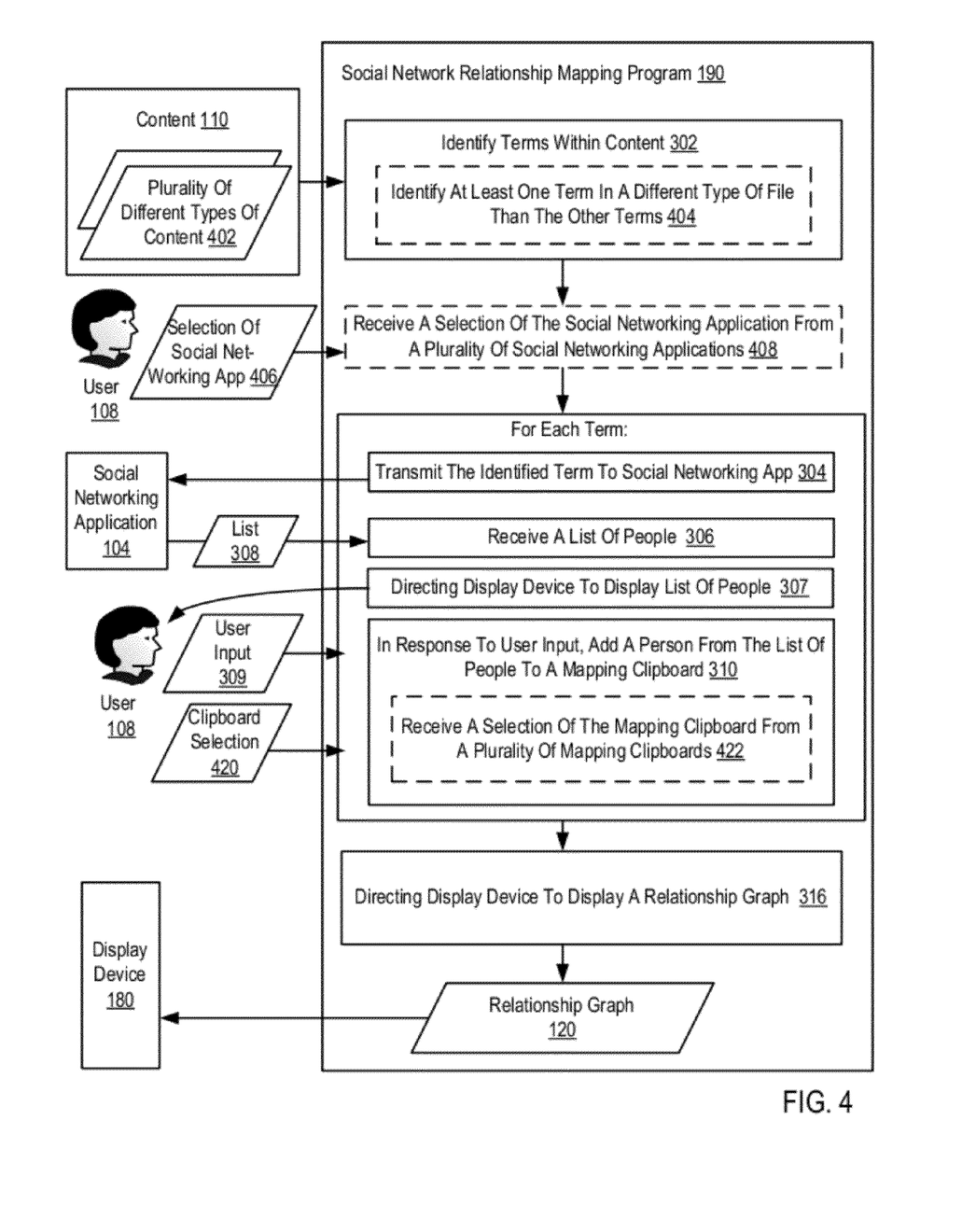
FIG. 4 sets forth a flow chart illustrating a further exemplary method for social network relationship mapping according to embodiments of the present invention.

For further explanation, FIG. 4 sets forth a flow chart illustrating a further exemplary method for social network relationship mapping according to embodiments of the present invention. The method of FIG. 4 includes the following elements of the method of FIG. 3: social network relationship mapping program (190) identifying (302) terms (112) within content (110) displayed to user (108); for each identified term of identified terms (112), social network relationship mapping program (190) transmitting (304) the identified term (112) to one or more social networking servers (105) supporting social networking application (104); for each identified term of identified terms (112), in response to social network relationship mapping program (190) transmitting the identified term (112) to social networking application (104), social network relationship mapping program (190) receiving (306), from one or more social networking servers (105), list (308) of people that correspond with the identified term; for each identified term of identified terms (112), social network relationship mapping program (190) directing (307) display device (180) to display list (308) of people that correspond with the identified term; for each identified term of identified terms (112), in response to user input (309), social network relationship mapping program (190) adding (310) identification (116) of a person from list (308) of people to mapping clipboard (118); social network relationship mapping program (190) directing (316) display device (180) to display relationship graph (120) that indicates how the people in mapping clipboard (118) are connected to each other in social networking application (104).

The elements of FIG. 4 that differ from the method of FIG. 3 are illustrated in FIG. 4 with a dashed line. More particularly, those elements include: social network relationship mapping program (190) identifying (404) at least one term in a different type of file than the other terms; social network relationship mapping program (190) receiving (408) from user (108) selection (406) of social networking application (104) from plurality (111) of social networking applications; and social network relationship mapping program (190) receiving (422) selection (420) of the mapping clipboard from plurality (119) of mapping clipboards.

The method of FIG. 4 includes social network relationship mapping program (190) identifying (404) at least one term in a different type of file than the other terms. Content (110) of FIG. 4 includes plurality (402) of different types of content. Plurality (402) of different types of content may include PDF files, text files, and so on.

The method of FIG. 4 includes social network relationship mapping program (190) receiving (408) from user (108) selection (406) of social networking application (104) from plurality of social networking applications. Receiving (408) selection (406) of social networking application (104) may be carried out by social network relationship mapping program (190) identifying plurality (111) of social networking applications that enable searching for identified terms, social network relationship mapping program (190) directing display device (180) to display an identification of each of plurality (111) of social networking applications to user (108), user (108) selecting an identification, and social network relationship mapping program (190) storing selection (406) identifying social networking application (104) on social network relationship mapping computer (102).

Social network relationship mapping program (190) adding (310) identification of person (116) from list (308) to mapping clipboard (118) includes social network relationship mapping program (190) receiving (422) from user (108) selection (420) of mapping clipboard (118) from plurality (119) of mapping clipboards. Receiving (422) selection (420) of mapping clipboard (118) may be carried out by social network relationship mapping program (190) presenting selection options that include creating new mapping clipboards, managing mapping clipboards, editing mapping clipboards. Receiving (422) selection (420) may also be carried out by social network relationship mapping program (190) associating a person with a particular mapping clipboard or multiple mapping clipboards and social network relationship mapping program (190) storing selection (420) on social network relationship mapping computer (102).

Figure 5:
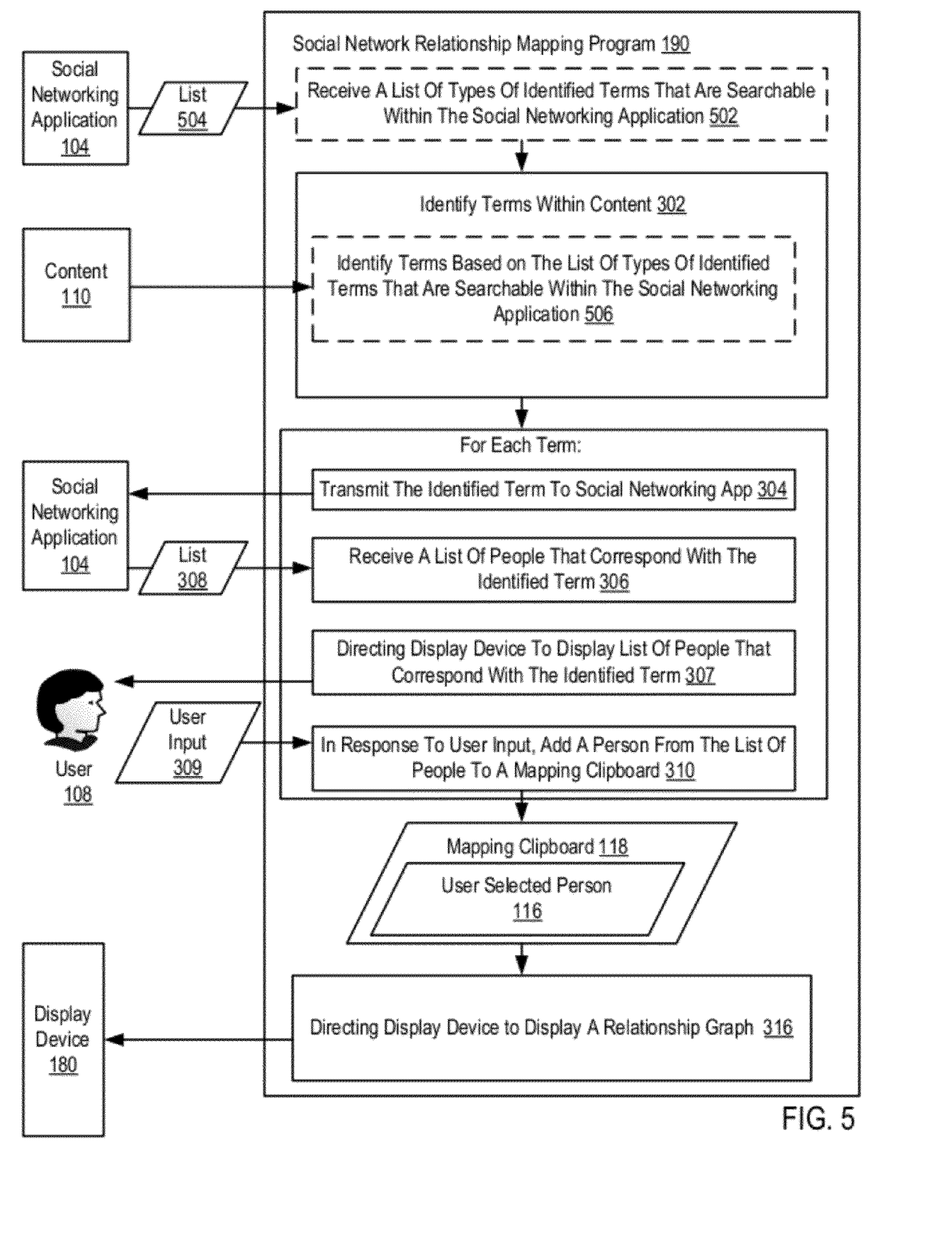
FIG. 5 sets forth a flow chart illustrating a further exemplary method for social network relationship mapping according to embodiments of the present invention.

For further explanation, FIG. 5 sets forth a flow chart illustrating a further exemplary method for social network relationship mapping according to embodiments of the present invention. The method of FIG. 5 includes the following elements of the method of FIG. 3: social network relationship mapping program (190) identifying (302) terms (112) within content (110) displayed to user (108); for each identified term of identified terms (112), social network relationship mapping program (190) transmitting (304) the identified term to one or more social networking servers (105) supporting social networking application (104); for each identified term of identified terms (112), in response to social network relationship mapping program (190) transmitting identified terms (112) to social networking application (104), social network relationship mapping program (190) receiving (306), from social networking servers (105), list (308) of people that correspond with the identified term; for each identified term of identified terms (112), social network relationship mapping program (190) directing (307) display device (180) to display list (308) of people that correspond with identified terms (112); for each identified term of identified terms (112), in response to user input (309), social network relationship mapping program (190) adding (310) identification (116) of a person from list (308) of people to mapping clipboard (118); social network relationship mapping program (190) directing (316) display device (180) to display relationship graph (120) that indicates how the people in mapping clipboard (118) are connected to each other in social networking application (104).

The elements of FIG. 5 that differ from the method of FIG. 3 are illustrated in FIG. 5 with a dashed line. More particularly, those elements include: social network relationship mapping program (190) receiving (502) list (504) of types of identified terms that are searchable within social networking application (104); and social network relationship mapping program (190) identifying (506) terms based on list (504) of types of identified terms that are searchable within social networking application (104).

The method of FIG. 5 includes social network relationship mapping program (190) receiving (502) list (504) of types of identified terms that are searchable within social networking application (104). Receiving (502) list (504) may be carried out by social network relationship mapping program (190) establishing a connection between social network relationship mapping computer (102) and one or more social networking servers (105) supporting social networking application (104), social network relationship mapping program (190) querying social networking application (104) for a list of types of terms that are supported by social networking application (104), and social network relationship mapping program (190) receiving data corresponding to the types of terms that are searchable by social networking application (104). The types of identified terms that are searchable within social networking application (104) may include names, email addresses, phone numbers, tags, employee identifiers, and employer identifiers.

The method of FIG. 5 includes social network relationship mapping program (190) identifying (302) terms (112) within content (110). Identifying (302) terms (112) within content (110) includes social network relationship mapping program (190) identifying (506) terms based on list (504) of types of identified terms that are searchable within social networking application (104). Identifying (506) the terms based on list (504) may be carried out by social network relationship mapping program (190) searching for data, such as strings, text, and expressions, within content (110) that are identified within list (504), social network relationship mapping program (190) categorizing the results of the search based on the type of the term, and social network relationship mapping program (190) directing display device (180) to display the identified terms according to the type of the term, such as highlighting different types of terms different colors.

Figure 6:
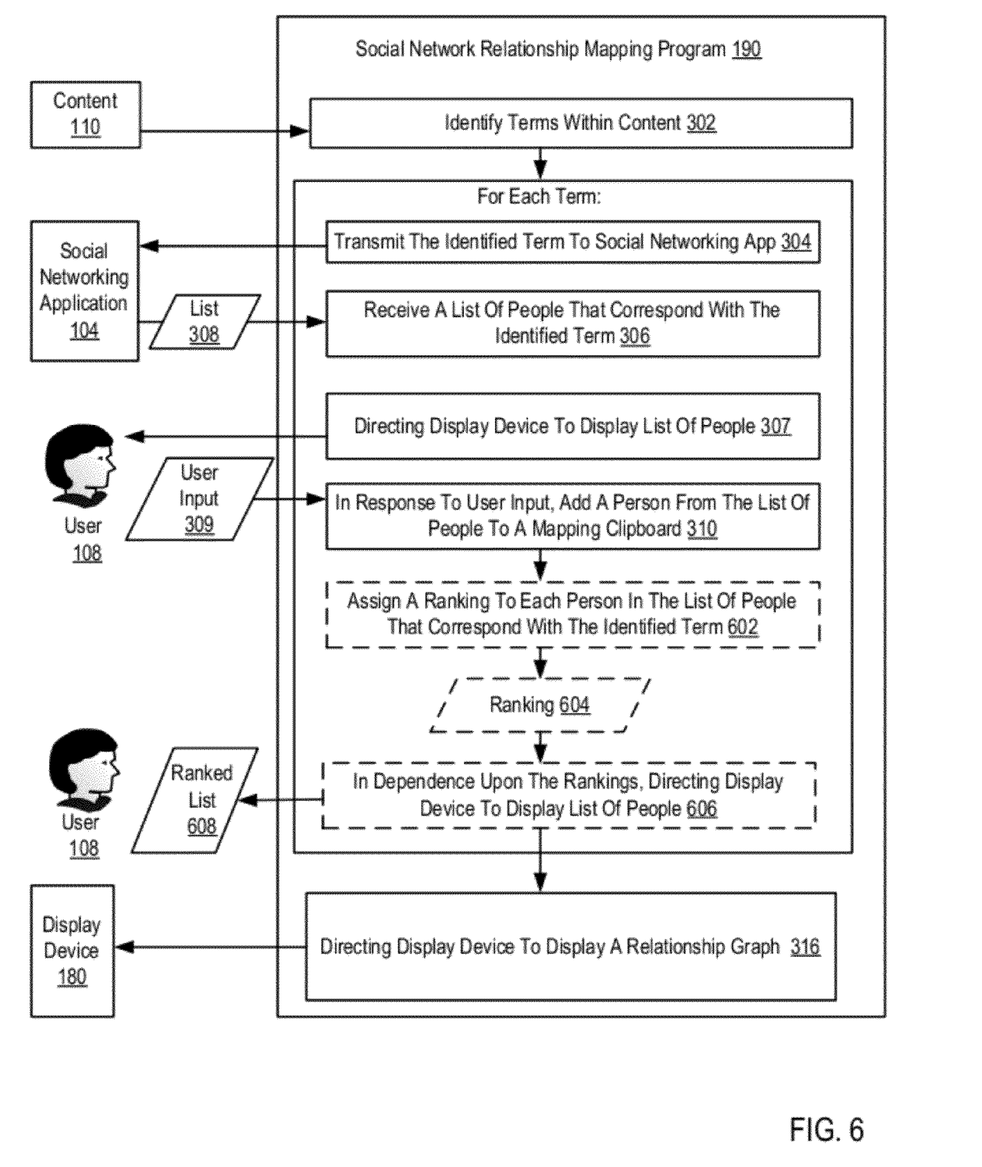
FIG. 6 sets forth a flow chart illustrating a further exemplary method for social network relationship mapping according to embodiments of the present invention.

For further explanation, FIG. 6 sets forth a flow chart illustrating a further exemplary method for social network relationship mapping according to embodiments of the present invention. The method of FIG. 6 includes the following elements of the method of FIG. 3: social network relationship mapping program (190) identifying (302) terms (112) within content (110) displayed to user (108); for each identified term of identified terms (112), social network relationship mapping program (190) transmitting (304) the identified term to one or more social networking servers (105) supporting social networking application (104); for each identified term of identified terms (112), in response to social network relationship mapping program (190) transmitting the identified term to social networking application (104), social network relationship mapping program (190) receiving (306), from social networking servers (105) list (308) of people that correspond with the identified terms; for each identified term of identified terms (112), social network relationship mapping program (190) directing (307) display device (180) to display list (308) of people that correspond with the identified term; for each identified term of identified terms (112), in response to user input (309), social network relationship mapping program (190) adding (310) identification (116) of a person from list (308) of people to mapping clipboard (118); social network relationship mapping program (190) directing (316) display device (180) to display relationship graph (120) that indicates how the people in mapping clipboard (118) are connected to each other in social networking application (104).

The elements of FIG. 6 that differ from the method of FIG. 3 are illustrated in FIG. 6 with a dashed line. More particularly, those elements include: social network relationship mapping program (190) assigning (602) ranking (604) to each person in list (308) of people that correspond with the identified term; and in dependence upon rankings (604), social network relationship mapping program (190) directing (606) display device (180) to display list (608) of the people that correspond with identified term (606).

The method of FIG. 6 includes social network relationship mapping program (190) assigning (602) ranking (604) to each person in list (308) of people that correspond with the identified term. Assigning (602) ranking (604) may be carried out by social network relationship mapping program (190) determining the number of times that the particular person has been identified as corresponding to the term, social network relationship mapping program (190) storing the number of times that the particular person has been identified, and social network relationship mapping program (190) sorting the names of the people in list (308) based on the number of times the people have been identified. Assigning (602) ranking (604) may also be carried out by social network relationship mapping program (190) determining the distance of the particular person from user (108) within social networking application (104), social network relationship mapping program (190) storing the distances of the people in list (308), and social network relationship mapping program (190) sorting the names of the people in list (308) based on the distances relative to user (108). The distances may be calculated based on the number of connections to other people between the particular person and user (108).

The method of FIG. 6 also includes in dependence upon rankings (604), social network relationship mapping program (190) directing (606) display device (180) to display list (608) of the people that correspond with identified term. Directing (606) display device (180) to display list (608) in dependence upon rankings (604) may be carried out by social network relationship mapping program (190) reordering list (308) based on rankings (604) to form ranked list (608), social network relationship mapping program (190) storing ranked list (608) on social network relationship mapping computer (102), and social network relationship mapping program (190) transmitting ranked list (608) to user (108) through display device (180).

Figure 7:
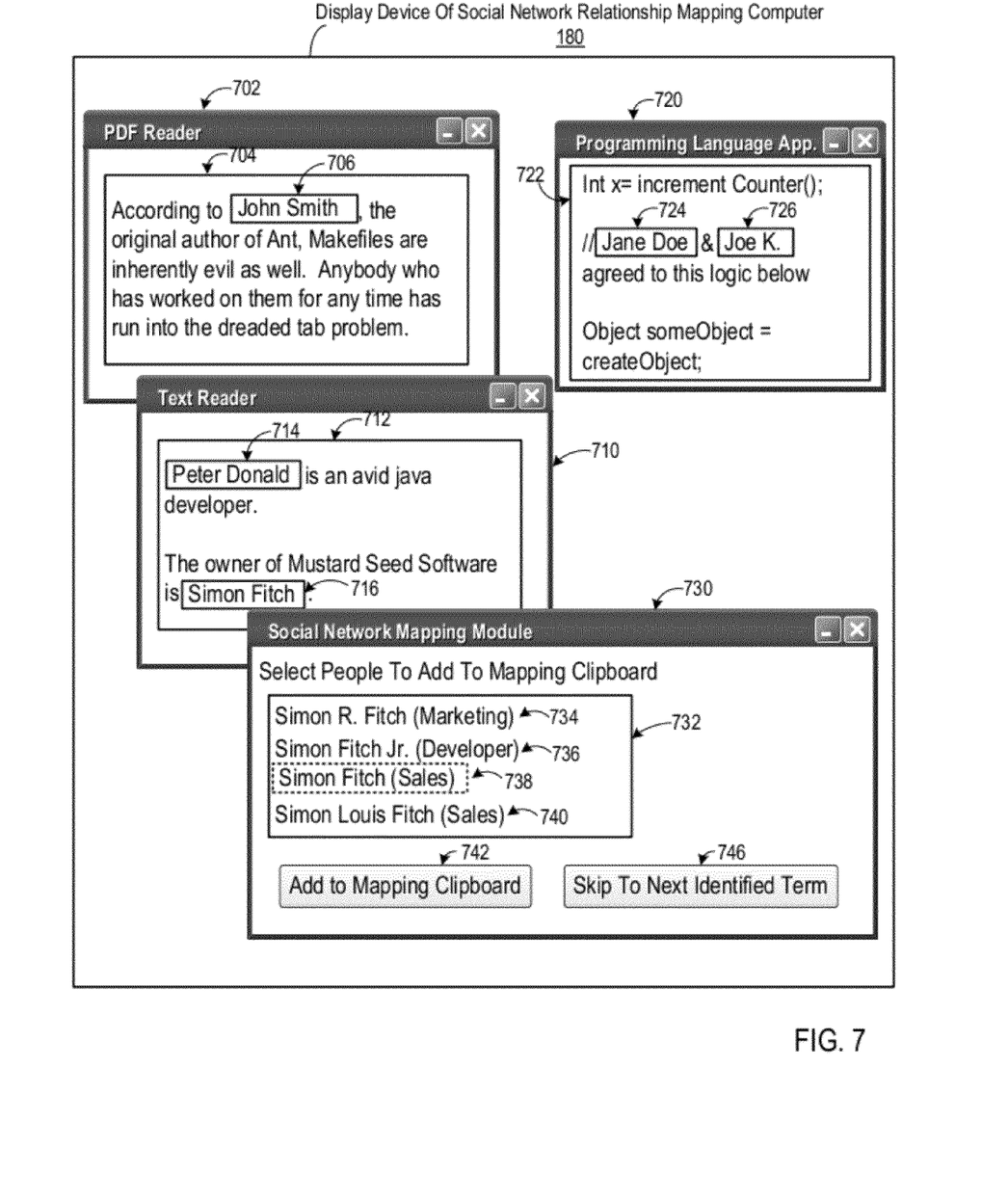
FIG. 7 sets forth a display device of a social network relationship mapping computer displaying a graphical user interface of the social network relationship mapping program of FIG. 2 for social network relationship mapping according to embodiments of the present invention.

For further explanation, FIG. 7 sets forth display device (180) of social network relationship mapping computer (102) displaying graphical user interface (GUI) (730) of social network relationship mapping program (190) for social network relationship mapping according to embodiments of the present invention. Display device (180) also displays GUI (702) of a PDF reader program, GUI (710) of a text reader program, and GUI (720) of a programming language application. Each of GUIs (702, 710, 720) of the PDF reader program, the text reader program, and the programming language application includes text area (704, 712, and 722), respectively. In other embodiments, elements displayed on any of GUIs (702, 710, 720, and 730) discussed can also be displayed on any other type of user interface, including, but not limited to, a web user interface (WUI).

Social network relationship mapping program (190) of social network relationship mapping computer (102) is configured to identify terms (112) within a plurality of different types of files, each being an example of content (110). In one example, in GUI (702) of the PDF reader program, social network relationship mapping program (190) identified the term "John Smith." In this case, as part of the process of identifying term "John Smith," social network relationship mapping program (190) placed a box around the term. In another example, in GUI (710) of the text reader program and GUI (720) of the programming language application, social network relationship mapping program (190) identified the terms "Peter Donald" (714), "Simon Fitch" (716), "Jane Doe" (724), and "Joe K" (726), respectively. Although a box is used to identify the terms, any indication may be used to identify the terms to a user.

In response to identifying the terms, social network relationship mapping program (190) transmits the terms to social networking application (104) and receives for each identified term, a list of people that correspond with the identified term. Social network relationship mapping program (190) generates GUI (730) to display the list of people corresponding to the identified term. In one example, GUI (730) includes selectable drop down menu (732) that displays the list of people corresponding to the identified term "Simon Fitch." As illustrated, in this example, social network relationship mapping program (190) received four people (734, 736, 738, and 740) in the list that identifies people that correspond to the term "Simon Fitch."

In GUI (730) of FIG. 7, the user has selected third person (738) on drop down menu (732). Although the selection of third person (738) is illustrated as a dashed-line box, any indication may be used to differentiate a selection by the user from non-selected names.

GUI (730) of FIG. 7 includes button (742) to add a name selected in drop down menu (732) to a mapping clipboard, such as mapping clipboard (118) of FIG. 1. In response to the user pressing add button (742), social network relationship mapping program (190) adds the selected name to the mapping clipboard. GUI (730) also includes skip button (746) to skip to the next identified term. In response to the user pressing skip button (746), in one example, social network relationship mapping program (190) skips to another term, such as "Jane Doe" (724), "Joe K" (726), "John Smith" (706), or "Peter Donald" (714).

Figure 8:
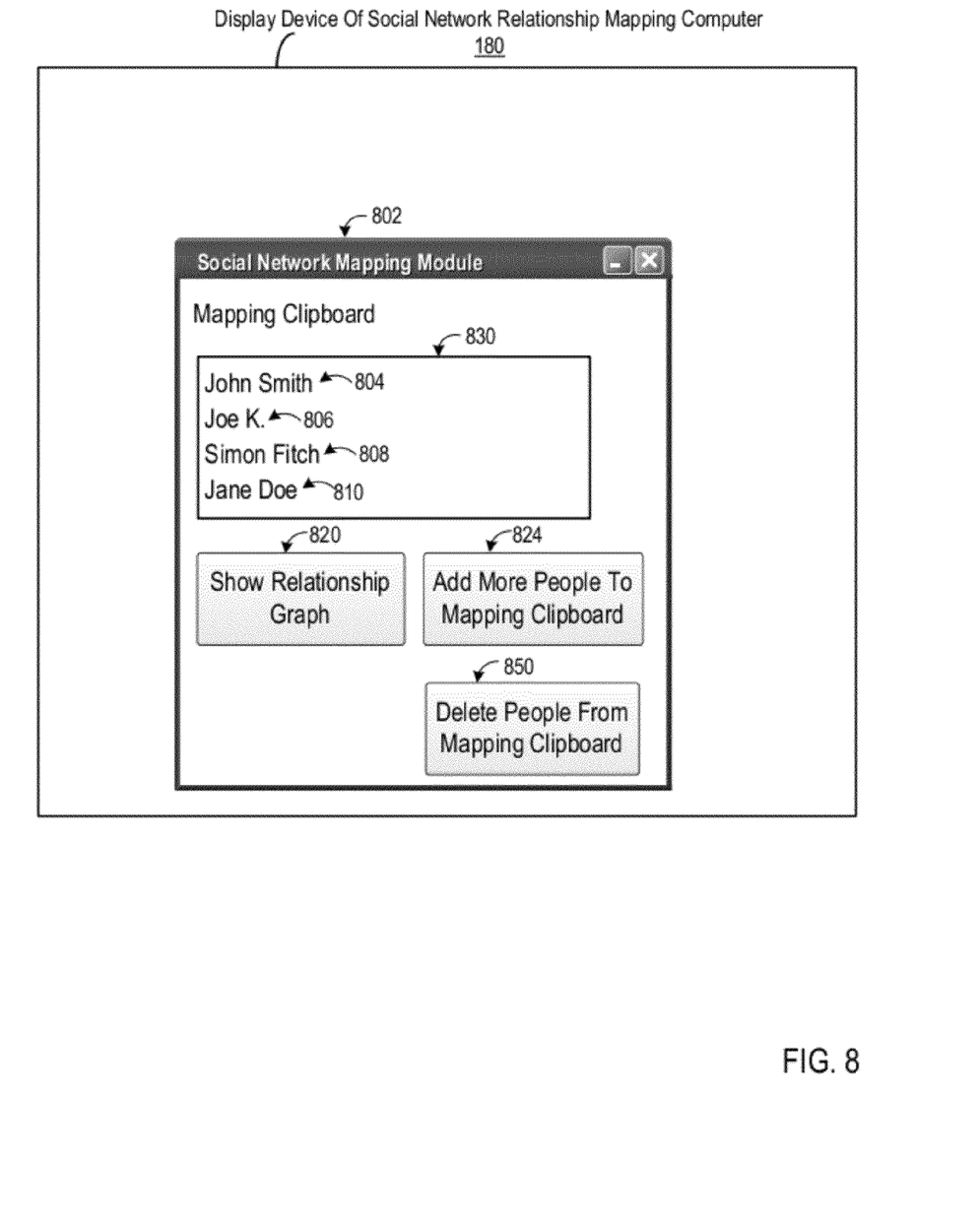
FIG. 8 sets forth a display device of a social network relationship mapping computer displaying another graphical user interface of the social network relationship mapping program of FIG. 2 for social network relationship mapping according to embodiments of the present invention.

For further explanation, FIG. 8 sets forth display device (180) of social network relationship mapping computer (102) displaying another graphical user interface (GUI) (802) of social network relationship mapping program (190) for social network relationship mapping according to embodiments of the present invention. GUI (802) of social network relationship mapping program (190) includes mapping clipboard (830) that displays the identifications of people that a user has selected from lists of people corresponding to identified terms. Mapping clipboard (830) is an example of mapping clipboard (118) of FIG. 1. The exemplary mapping clipboard (830) of FIG. 8 includes the names of "John Smith" (804), "Joe K" (806), "Simon Fitch" (808), and "Jane Doe" (810).

GUI (802) also includes show button (820), add button (824), and delete button (850). In response to the user pressing show button (820), social network relationship mapping program (190) directs display device (180) to display relationship graph (120) that illustrates the connections of people listed in mapping clipboard (830). In response to the user pressing add button (824), social network relationship mapping program (190) searches for at least one more of identifying terms (112) in content (110) and displays a window indicating names corresponding to the at least one more of identifying terms (112). In response to the user pressing delete button (850), social network relationship mapping program (190) deletes one or more of the names listed in mapping clipboard (830).

Figure 9:
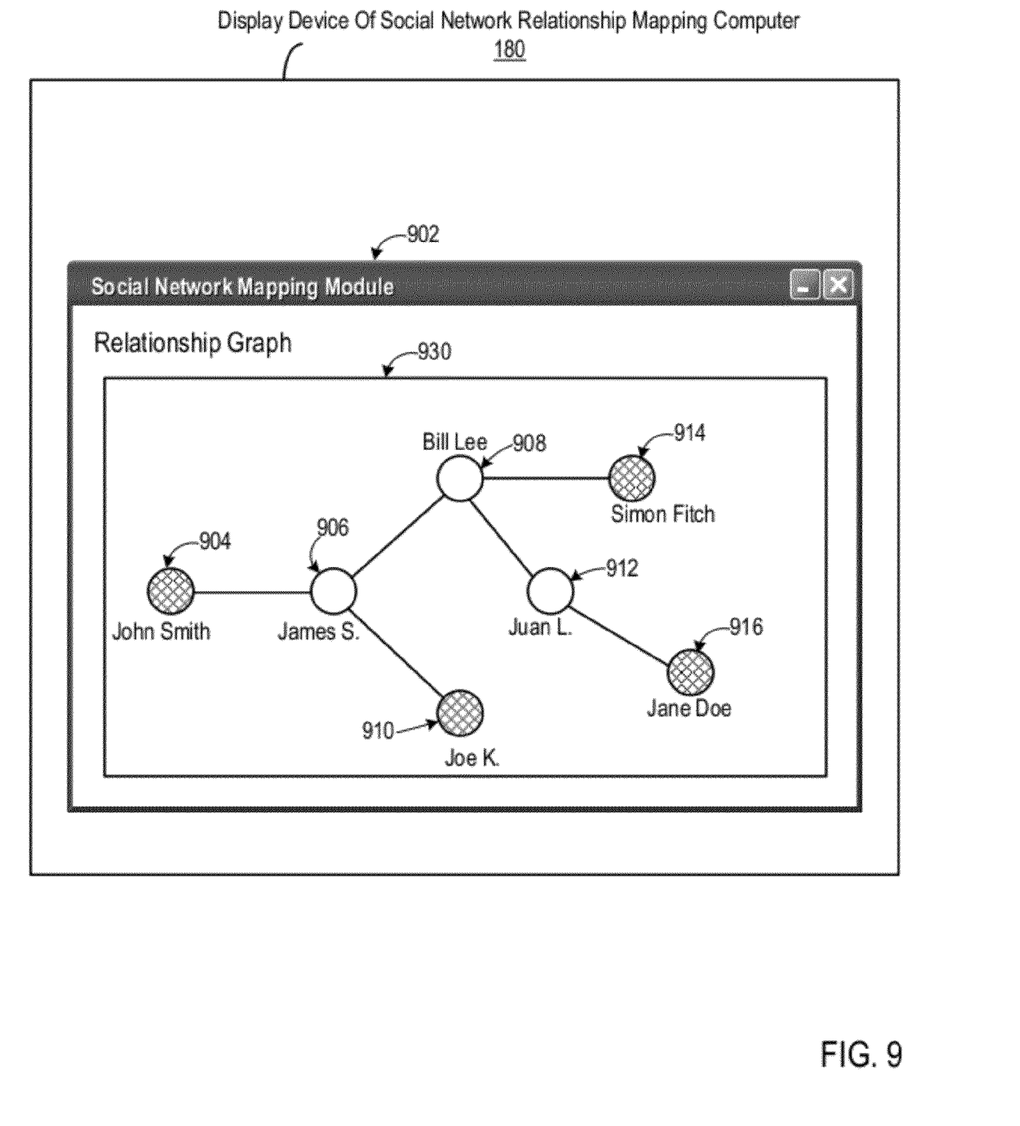
FIG. 9 sets forth a display device of a social network relationship mapping computer displaying another graphical user interface of the social network relationship mapping program of FIG. 2 for social network relationship mapping according to embodiments of the present invention.

For further explanation, FIG. 9 sets forth display device (180) of social network relationship mapping computer (102) displaying another graphical user interface (GUI) (902) of social network relationship mapping program (190) for social network relationship mapping according to embodiments of the present invention. GUI (902) of social network relationship mapping program (190) includes relationship graph (930) that indicates the connections of people in a mapping clipboard, such as mapping clipboard (830) of FIG. 8. Relationship graph (930) is an example of relationship graph (120) of FIG. 1.

In the example of FIG. 9, people are represented by circles and connections between people are represented by lines between the circles. In exemplary relationship graph (930) of FIG. 9, social network relationship mapping program (190) displays the connections of the people listed in mapping clipboard (830) of FIG. 8, "John Smith" (904), "Joe K" (910), "Simon Fitch" (914), and "Jane Doe" (916). Persons listed in the mapping clipboard (830) are indicated in relationship graph (930) with a dark circle. As illustrated in relationship graph (930), none of the persons listed in the mapping clipboard (830) are directly connected. When persons listed in mapping clipboard (830) are not directly connected, social network relationship mapping program (190) searches for additional persons using previously described methods to add to relationship graph (930). In the exemplary relationship graph (930) of FIG. 9, social network relationship mapping program (190) added persons "James S" (906), "Bill Lee" (908), and "Juan L" (912) to indicate how the persons listed in mapping clipboard (830) are connected. Persons that are added to relationship graph (930) but are not identified in mapping clipboard (830) are indicated with a clear circle.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage devices having computer readable program code embodied thereon.

Any combination of one or more computer readable storage devices may be utilized. A computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible device that can store a program for use by or in connection with an instruction execution system, apparatus, or device. The term "computer readable storage device" does not encompass a signal propagation media.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied thereon.

Any combination of one or more computer-readable medium(s) may be utilized. The computer-readable medium may be a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium may be any tangible medium that can store a program for use by or in connection with an instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for determining and displaying relationships in a social network, the method comprising the steps of:
    a computer identifying within content displayed to a user, one or more terms within displayed application window text areas of at least two different types of computer program applications;
    for each of the identified terms:
    the computer visually distinguishing the identified term in the displayed application window text areas;
    the computer transmitting the identified term to one or more servers executing a social networking application;
    the computer receiving from the one or more servers a list of people that correspond to the identified term;
    the computer directing a display device to display the list of people that correspond to the identified term;
    the computer directing a display device to display a mapping clipboard program graphical user interface;
    the computer receiving input from the user of an identification of a person from the list of people that correspond to the identified term;
    the computer receiving from the user a selection of a mapping clipboard from a plurality of mapping clipboards;
    the computer adding the identification of the person from the list of people to the mapping clipboard; and
    in response to user selection of one of the people in the list of people that correspond to the identified term, the computer directing the display device to display a graph that shows how the one person and other people identified in the list are connected to each other in the social networking application, wherein the connections represent a friend, relative, colleague, present co-worker, former co-worker, or classmate.

2. The method of claim 1, wherein the content includes a plurality of different types of files; and wherein the step of the computer identifying, within content displayed to the user, one or more terms includes a step of the computer identifying a first of the terms in a first of the different types of files and a second of the terms in a second of the different types of files.

3. The method of claim 1, further comprising a step of the computer receiving from the user a selection of the social networking application from a plurality of social networking applications.

4. The method of claim 1, further comprising:
    the computer receiving a list of types of identified terms that are searchable within the social networking application;
    wherein the step of the computer identifying within content displayed to the user, the one or more terms within displayed application window text areas of at least two different types of computer program applications includes the step of the computer identifying terms within the content based on the list of types of identified terms that are searchable within the social networking application.

5. The method of claim 4, wherein the types of identified terms are selected from the group consisting of: names, email addresses, phone numbers, tags, employee identifiers, and employer identifiers.

6. The method of claim 1, further comprising the steps of:
    the computer assigning a ranking to each person in the list of people that corresponds with the identified term; and
    in dependence upon the rankings, the computer directing the display device to display to the user, a list of identifications of people that correspond with the identified term.

7. The method of claim 6, wherein the ranking for each person in the list is based on a number of times said each person has been identified as corresponding to the terms.

8. The method of claim 6, wherein the ranking for each person in the list is based on the number of connections to other people between the particular person and the user within the social networking application.

9. A computer program product comprising one or more computer-readable storage devices and computer-readable program instructions which are stored on the one or more storage devices and when executed by one or more processors, perform the method of claim 1.

10. A computer system comprising one or more processors, one or more computer-readable memories, one or more computer-readable storage devices and program instructions which are stored on the one or more storage devices for execution by the one or more processors via the one or more memories and when executed by the one or more processors perform the method of claim 1.

11. A computer system for determining and displaying relationships in a social network, the computer system comprising:
    one or more processors, one or more computer-readable memories and one or more computer-readable storage devices, and program instructions, stored on at least one of the one or more storage devices for execution by at least one of the one or more processors via at least one of the one or more memories, the program instructions comprising:
    program instructions to identify within content displayed to a user, one or more terms within displayed application window text areas of at least two different types of computer program applications;
    program instructions to visually distinguish the identified term in the displayed application window text areas;

program instructions to transmit, for each identified term, the identified term to one or more servers executing a social networking application;

program instructions to, for each identified term, receive from the one or more servers a list of people that correspond to the identified term;

program instructions to direct a display device, for each identified term, to display the list of people that correspond to the identified term;

program instructions to direct a display device to display a mapping clipboard program graphical user interface;

program instructions to receive from the user a selection of a mapping clipboard from a plurality of mapping clipboards;

program instructions to add, for each identified term, in response to user input, an identification of a person from the list of people the mapping clipboard; and program instructions to direct the display device to display a graph that indicates how the person and other people identified in the mapping clipboard are connected to each other in the social networking application, wherein a connection represents one of a friend, relative, colleague, present co-worker, former co-worker, or classmate.

12. The system of claim 11, wherein the content includes a plurality of different types of files; and wherein the program instructions to identify terms within the content include program instructions to identify a first of the terms in a first of the different types of files and a second of the terms in a second of the different types of files.

13. The system of claim 11 further comprising program instructions to receive from the user a selection of the social networking application from a plurality of social networking applications.

14. The system of claim 11, further comprising program instructions to receive a list of types of identified terms that are searchable within the social networking application;

wherein the program instructions to identify terms within the content include program instructions to identify terms within the content based on the list of types of identified terms that are searchable within the social networking application.

15. A computer program product for determining and displaying relationships in a social network, the computer program product comprising:

one or more computer-readable storage devices and program instructions, stored on at least one of the one or more storage devices, the program instructions comprising:

program instructions to identify, based on a list of types of identified terms that are searchable within a social networking application, within content displayed to a user, one or more terms within displayed application window text areas of at least two different types of computer program applications;

program instructions to visually distinguish the identified term in the displayed application window text areas;

program instructions to transmit, for each identified term, the identified term to one or more servers executing a social networking application;

program instructions to, for each identified term, receive from the one or more servers a list of people that correspond to the identified term;

program instructions to direct a display device, for each identified term, to display the list of people that correspond to the identified term;

program instructions to direct a display device to display a mapping clipboard program graphical user interface;

program instructions to receive from the user a selection of a mapping clipboard from a plurality of mapping clipboards program instructions to add, for each identified term, in response to user input, an identification of a person from the list of people to the mapping clipboard; and program instructions to direct the display device to display a graph that indicates how the person and other people identified in the mapping clipboard are connected to each other in the social networking application, wherein a connection represents one of a friend, relative, colleague, present co-worker, former co-worker, or classmate.

16. The computer program product of claim 15, wherein the content includes a plurality of different types of files; and wherein the program instructions to identify terms within the content include program instructions to identify a first of the terms in a first of the different types of files and a second of the terms in a second of the different types of files.

17. The computer program product of claim 15 further comprising program instructions to receive from the user a selection of the social networking application from a plurality of social networking applications.

* * * * *